United States Patent [19]
Dini

[11] 3,808,878
[45] May 7, 1974

[54] METHOD FOR SENSING THE DEPTH OF CELLULAR PITS FORMED IN A MATERIAL LAYER

[75] Inventor: Mamiliano Dini, Munich, Germany

[73] Assignee: European Rotogravure Association, Munich, Germany

[22] Filed: Jan. 24, 1972

[21] Appl. No.: 219,991

[30] Foreign Application Priority Data
Mar. 19, 1971 Germany............................ 2113351

[52] U.S. Cl............... 73/67.8 S, 96/36.3, 33/125 W
[51] Int. Cl. ........................................... G01n 29/00
[58] Field of Search............ 73/67.7, 67.8 R, 67.8 S, 73/67.9; 356/157, 158; 33/125 W

[56] References Cited
UNITED STATES PATENTS
3,349,609   10/1967   Ryzhov-Nikonov et al. ........ 73/67.9
FOREIGN PATENTS OR APPLICATIONS
117,892   6/1958   U.S.S.R............................... 73/67.8

Primary Examiner—Donald O. Woodiel
Assistant Examiner—John P. Beauchamp
Attorney, Agent, or Firm—LeBlanc & Shur

[57] ABSTRACT

A method is presented for sensing the depth of cells formed in a material layer preferably during the preparation of rotogravure cylinders by etching. The cells are formed in at least two regions of the surface of said material layer, and the cells have one of their sidewalls or a portion of one of their sidewalls extending at the same angle relative to the surface of said material layer. Each of the sidewalls or sidewall portions extending parallel to each other, all cells of any region having identical depths, and the cells of adjacent regions having different depths. The method of this invention includes scanning individually and successively said regions with a bundle of ultrasonic beams projected at an angle onto the surface of said material layer. The intensity of the partial bundle reflected parallel to the incident beam from the bottom and from the wall or wall portions of each cell of each respectively scanned region is measured. The measured intensities of said partial bundle reflected from the cells of said regions are then compared with the beams reflected from all other flat surfaces being ignored to measure the depth of the cells in each region.

10 Claims, 7 Drawing Figures

Fig. 1
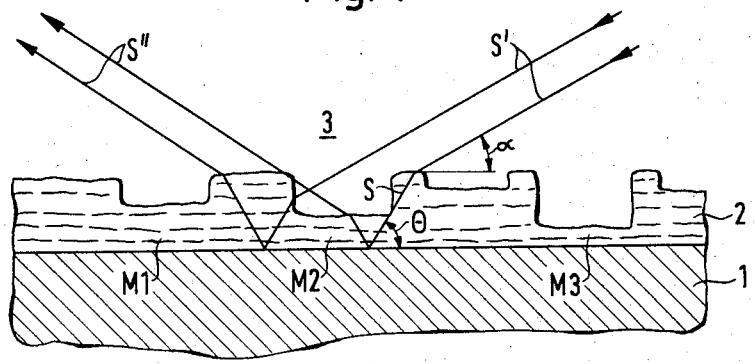
Fig. 2
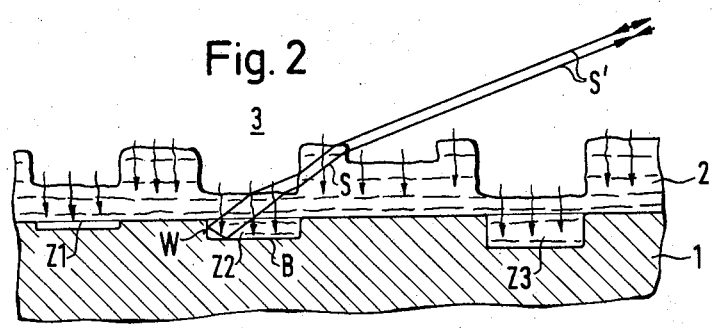
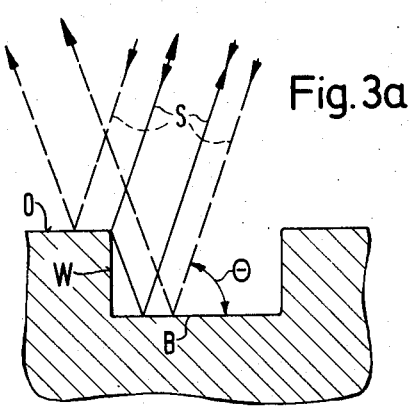
Fig. 3a
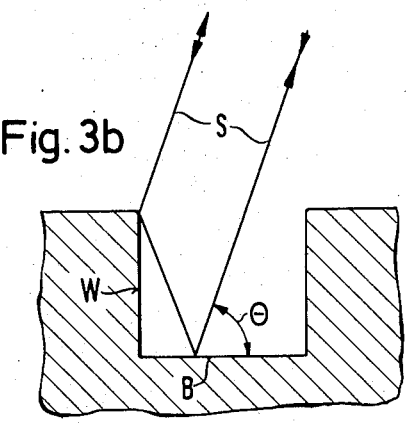
Fig. 3b

METHOD FOR SENSING THE DEPTH OF CELLULAR PITS FORMED IN A MATERIAL LAYER

The invention relates to a method of sensing the depth of cellular pits formed in a surface, which method is particularly useful in the preparation of rotogravure cylinders by etching.

In engraving rotorgravure cylinders to be used in an intaglio printing process, a plurality of closely ajacently spaced cells or cup-shaped pits are etched into the surface of the cylinder, the arrangement or pattern of said cells being defined by masks applied to the cylinders which masks are commonly termed "resist layers" in this specific field of technics. During the printing operation, these cells receive the printing ink and establish varying intensities of color shade to be reproduced depending on their volume, so that a desired pattern including the respective variations of color tone intensity can be reproduced.

Owing to the fact that the intensity of the printing operation depends on the amount of printing ink contained in the individual cells, and thus on the diameter and/or on the depth of the cells, in the preparation of the printing cylinders not only is a proper masking of the cylinder surface of importance, but to a substantial degree also an exact control of the etching operation. In addition to the material of the cylinder to be treated, the material of the resist layer, and the chemical composition of the etchant, five parameters are in general decisive to the depth of etching, namely the concentration of the etchant, its temperature, its agitation relative to the cylinder surface, the duration of the etching operation and the thickness and permeability of the resist layer. Also, the ionic concentration within the resist layer and the electrostatic field conditions can be of some importance. In the conventional etching processes used heretofore, these parameters were adjusted in accordance with empirical values, whereby the expert, on the basis of his experience of long practice, decided in the course of the etching operation at which moment the etching treatment had to be terminated in order to obtain a product having the desired properties.

It is obvious that such empirical methods are reproducible to a limited degree only, that the products prepared in accordance with such methods are subject to a relatively high rate of rejection and that the cost of qualified personnel represents a major problem. Therefore, it would be desirable to be able to measure the volume of the cells during the course of etching by using technically scientific measuring methods, and to control the progress of the etching operation in consideration of the measured results obtained.

In attempts to measure optically the depth or volume of cells, substantial measuring errors occured because of the high optical density of the etching liquid and the resist layer at the point where such etching operation proceeds. Moreover, the physical and optical characteristics of the etching liquid may also change throughout the process which fact greatly hinders the realization of reproducible results.

The possibility of allowing the etching operation to proceed while dispensing with any measuring and monitoring thereof, simply on the basis of parameter data gained from previous tests, has the disadvantage that methods of this type lack the necessary flexibility with respect to their adjustment to any desired etching depth, as well as their adaptation to any desired materials of the resist layer, and to any desired etchants, and that such methods will fail in the case of unpredicted disturbances in the course of processing.

Accordingly, it is an object of the invention to provide a method which permits, during the etching operation, the continuous and exact measurement of the volume and especially of the depth of cells etched into a surface covered by a layer comprising a permeable material, in order to control exactly the further etching operation and to terminate it at the proper moment, by making use of the measured results gained and by preventing reflection at the covering layer from affecting the measured results. This method should be independent of the physical and chemical characteristics of the etchant and of the covering layer.

In a method of sensing the depth of cells formed in a material layer, in which method additional cells are formed in at least two regions of the surface of said material layer, which cells each have one of their sidewalls or a portion of one of their sidewalls extending at the same angle relative to the surface of said material layer, whereby all of the sidewalls or sidewall portions extend parallel to each other and whereby all of the cells of any region each have identical depths but the cells of adjacent regions have different depths, this object is solved according to the method of this invention by scanning said regions individually and successively with a bundle of ultrasonic beams projected onto the surface of said material layer, at an angle to said surface, sensing the intensity of the partial bundle reflected parallel to the incident beams, from the bottom and from the wall or wall portion of each cell of the respectively scanned regions, ignoring the beams reflected from all other flat surfaces, and comparing the sensed intensities of the partial bundle of beams reflected from the cells of one region with the reflection from another region to sense the depth of the cells in each region.

The sensitivity of the measuring method of this invention is dependent upon the phenomenon of interference reinforcement which means that the back reflected wave fronts from all cells are in phase. This assumes an orderly array of cells. It is possible to obtain back reflected signals from a single cell or an unordered plurality of cells, but such signals would have a small amplitude, and for cells of a few microns in depth, would be almost immeasurable with commercially available ultrasonic equipment.

The basic difference of this method in comparison with the known echo sounding method, for example, for measuring the depth of the sea, consists in that the measuring signals are radiated onto the surface of the body to be tested under an angle $\theta$ so that only those reflections are received again which are reflected by cell walls or portions of cell walls extending substantially parallel to each other while the reflections produced at the surface of the object to be measured per se are eliminated or emitted in a direction opposite to the incident beam so as not to impinge on the measuring instrument.

Thus, the difference in the propagation times of a pair of beams produced by reflection at different depth levels is not measured, but rather the intensity of the produced reflection which depends on the size of the reflecting cell walls or cell wall portions is measured, which intensity in turn is proportional to the volume of the cells. The factor of proportionality depends on the general disposition and on the apparatus employed.

Refraining from measuring differences in echo time is of particular advantage if, as in the case of engraving rotogravure cylinders, the measurements are affected by oscillations and vibrations having amplitudes which could be of the same order of magnitude as the depth of the cells to be controlled. In this method the measuring errors which add to the measuring results render impossible a determination of the real depth of the cells.

There is already known a measuring method (German Pat. No. 881,266) wherein ultrasonic waves are passed under a predetermined angle into the object to be tested by means of a transmitted contacting the object, under test whereupon the ultrasonic waves after repeated reflection at the interfaces of the tested object are reflected by a flaw surface into the direction of the transmitter. The reflected beams are evaluated in accordance with the propagation time measuring method, by determining the time difference between the emitted ultrasonic beams and the received echo and by calculating from this time difference the position of the flaw surface within the test object. Obviously, however, this method merely allows the detection of the position of certain flat surfaces within an object to be tested but not the extension or form of such surfaces.

The method according to the invention is now explained in greater detail by making reference to measuring the depth or volume of the cells formed in a rotogravure cylinder, although this method can be used advantageously also in other fields of techniques, for example in the semiconductor technology or in the production of printed circuits.

In the drawings:

FIG. 1 is a cross-sectional view showing the course of propagation of the ultrasonic beams when using the method according to the invention, in a metallic surface provided with a mask, at a time when the etchant has not yet reached the metallic surface;

FIG. 2 is a cross-sectional view showing the course of the beams according to FIG. 1, at a time when some cells of different depths have been etched into the metallic surface;

FIGS. 3a and 3b show partly broken away, enlarged, sectional views through a cell having a rectangular cross-section formed in the metallic surface with the course of beams illustrated;

Figure 4:
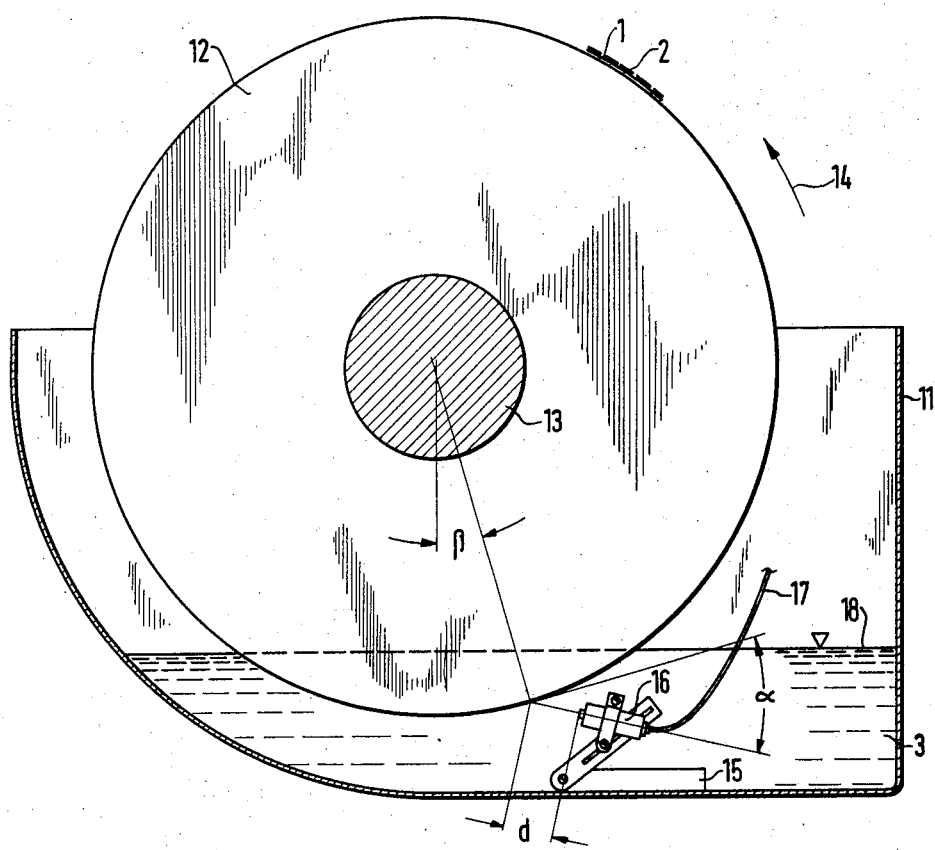
FIG. 4 is a schematic illustration of an apparatus which may be used for carrying out this invention.

FIGS. 1 and 2 show only the metallic layer 1, preferably made of copper, of a rotogravure cylinder to be provided with a predetermined pattern of cells $Z_1 - Z_3$ of different depths, which metallic layer is covered by a mask or resist layer 2 preferably formed of gelatine and having areas $M_1 - M_3$ of different thicknesses so that an etchant 3, for example $FeCl_3$ is capable of etching the metallic layer with varied delay and, thus, in a locally differentiated manner. The scale of the illustration is selected such that the surface of the metallic cylinder appears to be substantially horizontal. In order to form the cells Z for receiving the printing ink in the surface of the metallic layer 1, it is common practise to apply a resist layer 2 to the metallic layer and to expose it in a desired pattern prior to the etching process per se. Besides, the same resist layer 2 is exposed with a stepped pattern, the steps corresponding to regions of graduated intensities, in a portion adjacent to the portion actually intended to be used for printing, which pattern ranges from high intensity values of exposure resulting in a relatively hard area $M_4$, which, thus, is etched to a lesser degree by a developing liquid, to a lower intensity of exposure resulting in a less hard area $M_3$ which is etched to greater degree by the developing liquid. (Although for simplifying the illustration FIGS. 1 and 2 show one intermediate region $M_2$ only, it is to be understood that in practice the gelatine layer will be exposed up to 20 or typically to 10 graduated steps or regions of different intensities.) Thereupon, the thus exposed resist layer 2 is developed by washing away the less hardened areas so that the metallic layer 1 of the rotogravure cylinder has formed thereon a stepped pattern of graduated areas of respectively different thicknesses each, whereby step $M_1$ has relatively low permeability to the etchant, and step $M_3$ has relatively good permeability to the etchant. After the developing step, the etching process is performed by rotating the rotogravure cylinder within a bath containing the etchant 3, whereby the etchant penetrates through the resist layer 2 to the metallic layer 1 with gradually varying delay depending on the amount of hardness or "density" of the resist layer. (Instead of rotating the rotogravure cylinder within a bath containing the etchant, the cylinder may also be sprayed with an etchant.) All of these steps are commonly known in the art. The basic object of the invention consists in determining the achieved progress or the instantaneous depth, or the instantaneous volume, of the cells $Z_1, Z_2, ..., Z_n$ which have been formed respectively beneath the separate regions $M_1, M_2, ..., M_n$ of different degree of "density."
In view of the fact that the actual printing cells are treated or formed in the same manner as the cells of the graduated step pattern, measuring of the depth of the lastmentioned cells directly provides the desired indication or data concerning the depth of the printing cells.

As indicated, the time which the etchant requires to penetrate the resist layer 2 not only depends on the type and especially on the thickness and permeability of the resist layer, but, e.g., also on the concentration and the temperature of the etchant, on its degree of agitation relative to the cylinder surface, and on other variables which are difficult to define. Therefore it does not suffice to define the rate of diffusion of etchant 3 through the resist layer 2 step-by-step in the desired pattern, rather, the depth of the cells Z of each individual graduated step must actually be determinable at every instant of the etching process.

For example, if in the course of etching the measurement shows that the cells $Z_3$ and $Z_2$ reached the desired depth ratio relative to each other, the further progress of the etching process must be adjusted such that the etching operation of cell $Z_1$ commences at such point of time that there is obtained a desired depth ratio between cells $Z_2$ and $Z_1$. If this applies then either the penetration of the etchant through the resist layer 2 must be delayed in region $M_1$ which can be done, for example, by increasing the speed of rotation of the cylinder or by lowering the temperature, or the concentration of the etchant 3, or the rate of diffusion of the etchant through to resist layer must be speeded up in region $M_1$ in order that the etching process beneath the region $M_1$ may commence at an earlier point of time to form the cell $Z_1$, as the case may be.

In order to measure the volume or depth of the cells formed in the metallic layer 1 a parallel bundle of ultrasonic beams is produced by a not illustrated, conventional ultrasonic transmitter as used, e.g., for the measurement of the thickness of metallic layers in accordance with the resonance method, and emitted through the etchant 3 under an angle $\alpha$ onto the surface of the assembly consisting of layers 1 and 2 (FIGS. 1 and 2). In passing from the etchant 3 into the more dense medium of the resist layer 2, the beams S' of the bundle are refracted so that they impinge under an angle of $\theta$ onto the surface of the metallic layer (beams S).

If the metallic layer 1 has not yet been altered by the etching process, i.e., if it has a substantially smooth surface as shown in FIG. 1, then the beams S incident under the angle $\theta$ on the metallic surface are totally reflected therefrom so that they, after repeated refraction at the interface between the layers 1 and 2 leave the etchant (beams S'') at an angle equal and opposite to the incident, and do not return to the ultrasonic transmitter or to a receiver positioned at the same place, respectively. Only negligible reflection occurs at the surface of the resist layer 2, which reflection, besides, also occurs under the angle $-\alpha$ and therefore - in contrast with the normal echo sounding method - does not reach the transmitter receiver.

FIG. 2 shows the picture which will appear when the etching process proceeded to such degree that cells $Z_1$ to $Z_3$ of different depths have been formed in the metallic layer 1. Accordingly, as seen in FIG. 3, some of the beams S reflected at the bottom B of a cell Z under an angle of $(180-\theta)°$, are again reflected when they meet the side wall W of the respective cell which extends substantially perpendicularly to the metallic surface, whereby such beams are deflected into a direction extending substantially parallel to the incident bundle of beams toward the location of the ultrasonic transmitter/receiver, whereby the intensity of the reflected signal received at said location results from the sum of all of the reflected beams which are produced at the wall W of those cells which are covered by the incident bundle of beams. It can be readily seen by comparing FIGS. 3a and 3b that the intensity of the received measuring signal depends on the size of the area of wall W, i.e., on the depth of the cell, because with a given diameter of the bundle of beams and with increasing size of the wall, or depth of the cell, respectively, an increasing portion of the emitted beams is returned to the receiver and measured thereby. FIGS. 3a and 3b show the boundary beams of the partial bundle which reach the receiver; any beams of the bundle (being illustrated in broken lines in FIG. 3a) which are beyond this partial bundle are reflected away from the receiver either at the bottom B of the cell or at the surface 0 of the metallic layer. The angle $\alpha$ is selected such that it guarantees a maximum yield of reflected beams.

For simplifying the explanation of the principle the invention is based upon, FIGS. 2 and 3 show cells Z of rectangular cross-section wherein the reflecting wall W extends substantially perpendicularly relative to the metal surface. However, this configuration does not form a mandatory requirement because according to the Huygens' principle, every point of wall W impinged upon by an incident light beam S, forms the origin of a spherical wave so that the intensity of the reflected waves passing to the receiver is only dependent on the number of such origins, i.e., on the size of the area of wall W which in turn is proportional to the depth of the cells Z. Accordingly, the cells Z may also have, e.g., triangular cross-section (so-called "hard dot cells") or semicircular cross-section. The illustration of cells Z having rectangular cross-section according to FIG. 3 has only been chosen for the reason that in this special case the existing conditions of reflection can be easily illustrated on the basis of the teachings of geometrical optics.

The ultrasonic transmitter may be positioned in any desired manner beneath or above the level of the etchant and should be mounted expediently in such manner that the angle $\theta$ may be varied in order to provide measuring signals of maximum intensity. Although generally any desired angle of less than 90° with respect to the surface may be used in carrying out the process for measuring the size of cells as used in rotogravure it has been found that angles $\theta$ of the order of from 10–45° and especially within the range near 30° are suitable for this purpose.

For analyzing the reflected beams in the course of the etching process, there is either positioned a sensitive receiver adjacent the ultrasonic transmitter, or there is used a combination instrument for transmitting and receiving the beams which receiver or instrument compares the beams reflected from the walls W of a pair of adjacent graduated steps of different depths and supplies this information to a not illustrated device for controlling the variables of the etching process which device is capable of performing corresponding adjustments or variations in the course of the etching process. Both for the transmitter and receiver, as well as for the controllers and adjusting devices for controlling or influencing the etching process, there may be used commercially available instruments which satisfy the requirements for conducting the method. FIG. 4 shows schematically the set-up of such an apparatus. In a bath 11 containing the etchant 3 there is mounted a cylinder 12 on shaft 13. Cylinder 12 is adapted to be rotated in the direction of arrow 14 by means of a not illustrated motor. The cylinder 12 supports the metallic layer 1 to be treated which layer in turn is covered by the resist layer 2 (which is indicated schematically at one place only of the cylinder surface because of the dimensional differences relative to the diameter of the cylinder). Within the etchant bath 11 there is mounted in a bracket 15 under an angle $\alpha$ relative to the tangent at the cylinder surface an ultrasonic transmitter and receiver assembly which is adapted to be connected to a not illustrated measuring and/or indication instrument via cable 17. The bracket 15 may be formed such that both the angle $\alpha$ and the spacing $d$ between the assembly 16 and the outer surface of the cylinder 12 are adjustable. The dotted line 18 indicates the height of the etchant level within the bath 11. The angular position of the point of incidence of the bundle of ultrasonic beams on the cylinder 12 as indicated as $\beta$ is absolutely without any importance.

The above explained method not only allows exact determination of the relative depths of different cells in a manner sufficient for monitoring the etching process during the manufacture of rotogravure cylinders, but also allows the performance of absolute measurements, provided the measuring apparatus is calibrated.

The following examples serve to further explain the invention.

EXAMPLE 1

A gelatine layer applied to a copper sheet of 0.15 millimeters thickness was exposed to light of a wavelength of 2,500 to 4,500 A. in 12 steps each being 15 mm wide and being separated from the adjacent step by an unexposed line being 0.5 mm wide, the intensity of exposure gradually increasing from one step to the adjacent step. Thereupon, the gelatine layer was developed by immersing it from 5 to 10 minutes into water of approximately 40° C so that graduated steps of gradually decreasing thickness were formed. The copper sheet treated in this manner was placed on the outside of a cylinder of 300 mm diameter, which was placed in an apparatus as shown in FIG. 4 and rotated with a speed of from 10 to 100 rpm in a bath containing $FeCl_3$ solution as the etchant. Spaced 25 mm from the drum surface, an ultrasonic standard transmitter and receiver (manufactured by Branson Instruments Company, Stamford, Connecticut, United States of America), powered by an instrument of the Vidigage type, was placed into the bath so as to emit a bundle of ultrasonic beams having a diameter of approximately 12.7 mm and impinged onto the surface under an angle $\alpha$ of approximately 30°. Because of the rotary movement of the drum, the 12 graduated steps were continuously scanned in succession.

Figure 5:
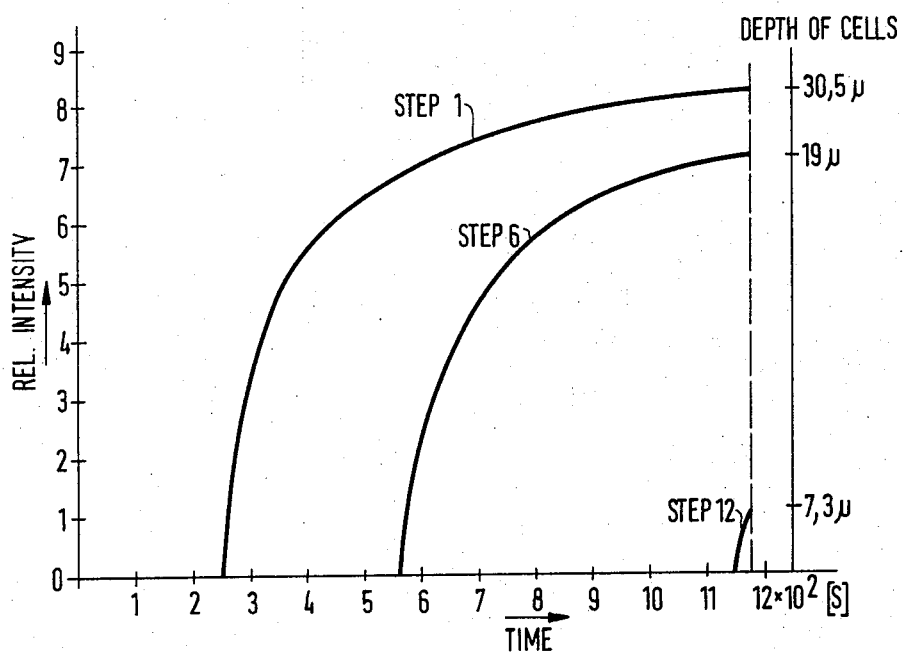
FIG. 5 is a graph plotting the intensities of the reflected partial beam versus time, for a plurality of graduated steps.

FIG. 5 shows graphically the intensity of the received, reflected signal versus time, for graduated steps Nos. 1, 6, and 12. The test was terminated after 1,175 seconds when the cells of Step No. 12 had reached approximately one-fourth of the depth of the cells of Step No. 1. The subsequently performed measurement of the absolute cell depth under a microscope which was not used for the actual control of the etching process, showed a depth of 30.5 microns for the cells of Step No. 1, a depth of 19.0 microns for the cells of Step No. 6, and a depth of 7.3 microns for the cells of Step No. 12.

The illustrated course of the curves may be varied without difficulty by corresponding variation of the parameters mentioned at the beginning, and that especially also by influencing the parameters in the course of the measurement if it is found that at a certain instant a curve shows a tendency to deviate from a desired course.

EXAMPLE 2

A pre-etched copper sheet provided with 12 steps of different cell depths in accordance with the method of Example 1 was stretched onto a drum of 300 mm diameter, which drum was rotated with a speed of from 10 to 100 rpm within a water bath in correspondence with the arrangement of FIG. 4. Of course, likewise it would be possible to keep the drum stationary and to pass the transmitter/receiver assembly along the copper sheet.

Figure 6:
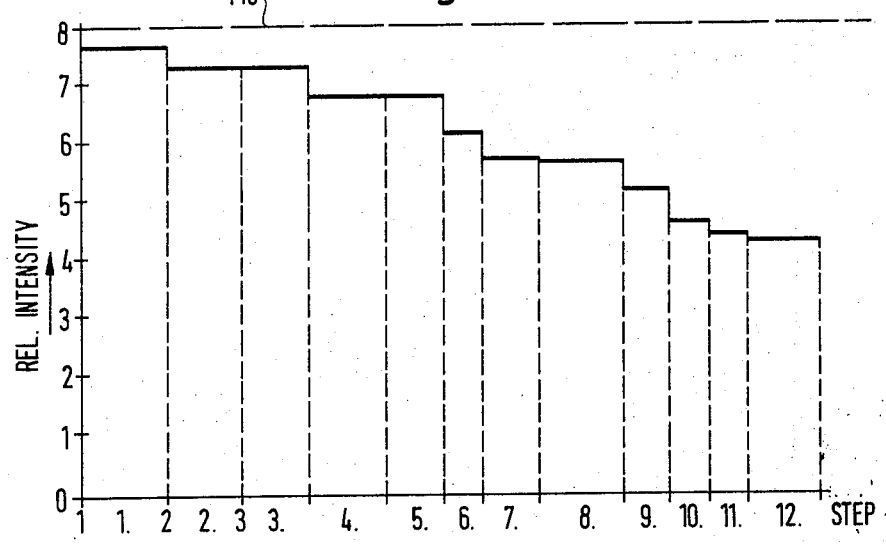
FIG. 6 shows a recorded diagram illustrating the result of the measuring of a sequence of graduated steps etched into a metallic surface.

FIG. 6 illustrates the recorded intensity of the received reflected signal during one pass of the graduated steps beneath the receiver. As shown, no discernable difference in depth exists between the cells of Steps Nos. 2 and 3, Steps Nos. 4 and 5, and Steps Nos. 7 and 8, respectively, whereas differences in the depth of the cells are present respectively between the cells of Steps Nos. 1 and 2, Steps Nos. 3 and 4, etc. The dotted line $M_o$ represents the intensity of the bundle of beams reflected in a direction opposite to the incident bundle of beams at the metallic surface where it has not been etched.

It can be seen from the preceding specification that the thickness of the resist layer, the height of the etchant above the resist layer, the temperature of the etchant, as well as variations of the physical and chemical characteristics of the etchant, do not bear any influence on the method. In the case of a cell depth equal to zero, the beams reflected from the surface face of the metallic layer advantageously leave the etchant in a direction opposite to the incident bundle of ultrasonic beams so that they do not reach the receiver. The present method may be used for measuring the depths of all kinds of cells, regardless of whether they have been formed by etching, mechanically, or in any other way, and regardless of the cross-sectional configuration of the cells.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of sensing the depth of cells formed in a material layer, particularly for use in the preparation of rotogravure cylinders by etching using resist layer masking, in which method additional cells are formed in at least two regions on the surface of said material layer by etching using resist layer masking having different predetermined thickness regions corresponding to the said at least two regions, which cells each have one of their sidewalls or a portion of one of their sidewalls extending under the same angle relative to the surface of said material layer, whereby all of these sidewalls or sidewall portions extend parallel to each other and whereby all of the cells of any region each have identical depths but the cells of adjacent regions have different depths, comprising the steps of: scanning said regions individually and successively with a bundle of ultrasonic beams projected onto the surface of said material layer, said beams being projected at an angle to said surface; sensing the intensity of the partial bundle of said beams reflected parallel to the incident beams from the bottom and from the wall or wall portion of each cell of the respectively scanned regions; comparing the sensed intensity of said partial bundle reflected from the cells of one region with the cells of another region to sense the relative depth of the cells in said regions, the beams reflected from said surface and all other surfaces lying in planes parallel thereto being ignored whereby the progress of the etching of the additional cells and thus the first recited cells may be determined and monitored.

2. The method of claim 1 wherein the cells formed in said material layer have a rectangular cross-sectional configuration.

3. The method of claim 1 wherein the cells formed in said material have a triangular cross-sectional configuration.

4. The method of claim 1 wherein the cells formed in said material layer have a semi-circular cross-sectional configuration.

5. The method of claim 1 wherein said bundle of ultrasonic beams are projected onto the surface of said material layer at an angle of from 10° to 70°.

6. The method of claim 5 wherein said beams are projected onto the surface of said material layer at an angle of from 20° to 60°.

7. The method of claim 5 wherein said beams are projected onto the surface of said material layer at an angle of 30°.

8. The method of claim 1 wherein a sequence of regions, adjacent regions having cells of different depths, are passed continuously below the bundle of ultrasonic beams so that the intensities of the partial bundles reflected within the cells of adjacent regions are continuously compared.

9. The method of claim 1 wherein a sequence of regions, adjacent regions having cells of different depths, are scanned in a pulsing manner by bundles of ultrasonic beams the intensities of the partial bundles reflected within the cells of different regions being continuously compared with each other.

10. The method of claim 1 wherein the measured intensities of the reflected partial bundles are compared with a preselected depth standard to ascertain the absolute depth of said cells.

* * * * *

UNITED STATES PATENT OFFICE
CERTIFICATE OF CORRECTION

Patent No. 3,808,878      Dated May 7, 1974

Inventor(s) Mamiliano Dini

It is certified that error appears in the above-identified patent and that said Letters Patent are hereby corrected as shown below:

In Column 1, line 9, "rotorgravure" should read --rotogravure--

In Column 3, line 15, "transmitted" should read --transmitter--

Signed and sealed this 19th day of November 1974.

(SEAL)
Attest:

McCOY M. GIBSON JR.
Attesting Officer

C. MARSHALL DANN
Commissioner of Patents